(12) United States Patent
Hull

(10) Patent No.: US 6,998,531 B2
(45) Date of Patent: Feb. 14, 2006

(54) ELECTRICAL MUD BOX WITH REMOVABLE COVER

(75) Inventor: Eric G. Hull, Madison, OH (US)

(73) Assignee: The Lamson & Sessions Co., Cleveland, OH (US)

(*) Notice: Subject to any disclaimer, the term of this patent is extended or adjusted under 35 U.S.C. 154(b) by 0 days.

(21) Appl. No.: 10/808,853

(22) Filed: Mar. 25, 2004

(65) Prior Publication Data

US 2005/0211457 A1    Sep. 29, 2005

(51) Int. Cl.
H02G 3/08    (2006.01)
(52) U.S. Cl. .............................. 174/50; 174/53; 174/58; 174/57; 220/3.2; 220/3.3; 220/3.8
(58) Field of Classification Search ............... 174/48, 174/50, 54, 56, 58, 59, 63, 64, 66, 67, 53; 220/3.2, 3.3, 3.4, 3.5, 3.6, 3.7, 3.8, 3.9, 4.02, 220/241, 242; 248/906; 52/63, 90.1, 108, 52/98, 292, 319
See application file for complete search history.

(56) References Cited

U.S. PATENT DOCUMENTS

| | | | |
|---|---|---|---|
| 1,952,719 A * | 3/1934 | Lewin | 220/3.8 |
| 2,038,291 A | 4/1936 | Hooley | 247/15 |
| 2,038,292 A | 4/1936 | Hooley | 247/26 |
| 2,983,399 A | 5/1961 | Slater et al. | 220/3.4 |
| 3,453,788 A | 7/1969 | Marin | 52/99 |
| 4,331,832 A * | 5/1982 | Curtis et al. | 220/3.7 |
| 4,742,585 A * | 5/1988 | Logsdon | 220/3.3 |
| 4,922,056 A * | 5/1990 | Larsson | 174/66 |
| 5,420,376 A * | 5/1995 | Rajecki et al. | 174/48 |
| 5,562,222 A | 10/1996 | Jordan et al. | 220/3.8 |
| 5,661,264 A * | 8/1997 | Reiker | 248/906 |
| 5,831,212 A * | 11/1998 | Whitehead et al. | 174/50 |
| 5,902,960 A | 5/1999 | Smith | 174/66 |
| 5,944,210 A * | 8/1999 | Yetter | 220/241 |
| 6,023,021 A * | 2/2000 | Matthews et al. | 174/66 |
| 6,274,809 B1 * | 8/2001 | Pudims et al. | 174/50 |
| 6,608,252 B1 * | 8/2003 | Hurley | 174/66 |
| 6,686,540 B1 | 2/2004 | Compagnone, Jr. | 174/58 |
| 6,774,307 B1 * | 8/2004 | Kruse et al. | 174/53 |

* cited by examiner

*Primary Examiner*—Angel R. Estrada
(74) *Attorney, Agent, or Firm*—Jones Day (57) ABSTRACT

An electrical enclosure for use in poured concrete construction has a front opening that is closed by a removable cover that prevents poured concrete from entering the enclosure cavity. The cover is a knockout cover that is molded integrally with the enclosure and is attached to the enclosure peripheral wall by a frangible web.

17 Claims, 8 Drawing Sheets

ELECTRICAL MUD BOX WITH REMOVABLE COVER

CROSS REFERENCE TO RELATED APPLICATIONS

This application is related to U.S. Ser. No. 10/680,637 filed Oct. 7, 2003, and to U.S. Ser. No. 10/680,795 filed Oct. 7, 2003, the disclosures of which are hereby incorporated herein by reference.

BACKGROUND OF THE INVENTION

This application relates the art of electrical boxes and, more particularly, to electrical mud boxes for use in poured concrete construction. The application particularly concerns electrical mud box assemblies of the type that include adapters and will be described with specific reference thereto. However, it will be appreciated that the application has broader aspects and that certain features can be used in electrical boxes that do not have adapters.

Because steel forms are used in tunnel forming of vertical concrete walls, fasteners such as nails or screws cannot be used to attached electrical boxes to the inside surface of the forms. Therefore, the electrical boxes commonly are attached to reinforcing bars before the forms are in place. It is very difficult, if not impossible, to maintain the open end of the electrical box in sealed engagement with the inner surface of a steel form to prevent poured concrete from entering the box. The open end of the box sometimes is closed with duct tape and the box cavity sometimes is filled with plastic foam that subsequently must be removed.

The steel forms typically are at least ten feet high, and the poured concrete develops significant hydraulic pressure that forces concrete to flow into the box cavity.

It would be desirable to provide an improved arrangement for closing the open end of an electrical mud box to prevent ingress of poured concrete while providing easy access to the box cavity when the concrete has cured and the forms are removed.

SUMMARY OF THE INVENTION

A molded plastic electrical enclosure has a peripheral wall with front and rear surfaces surrounding front and rear openings through which access is provided to a cavity within the peripheral wall.

The front opening is closed by a removable cover when the front surface is positioned against or adjacent to the inner surface of a concrete form. The removable cover prevents ingress of concrete to the enclosure interior when a wall is poured while providing ready access to the electrical enclosure cavity when the concrete has cured and the forms are removed.

In one arrangement, the removable cover is a knockout cover that is molded integrally in one piece with the peripheral wall of the electrical enclosure. A peripheral groove in the cover surface adjacent the peripheral wall leaves a frangible web of reduced thickness that fractures when a blow or force is applied to the cover.

The cover outer surface preferably is flush with the front surface of the peripheral wall or is recessed from the front surface within the enclosure cavity.

The cover preferably is attached to the inner surface of the peripheral wall so that removal thereof leaves the full area of the enclosure cavity available for use.

Enlarged bosses on the peripheral wall have fastener receiving openings that are closed by a barrier such as removable plugs or adhesive foil.

The inner surface of the cover may be provided with stiffening ribs radiating toward the cover outer periphery for transferring force outwardly to the frangible web.

The cover may have a thickness that is less than the thickness of the peripheral wall between the wall inner and outer surfaces.

The removable cover may be on an adapter that is attached to a box, and the front opening in the adapter that is closed by the removable cover may have a size and/or shape different from the box opening.

Small runners may extend across the groove in the cover to provide better flow of plastic material during molding and/or to reinforce the frangible web to at spaced intervals ensure that it will not fracture when the cover is subjected to high hydraulic pressure.

DESCRIPTION OF AN EMBODIMENT

Figure 1:
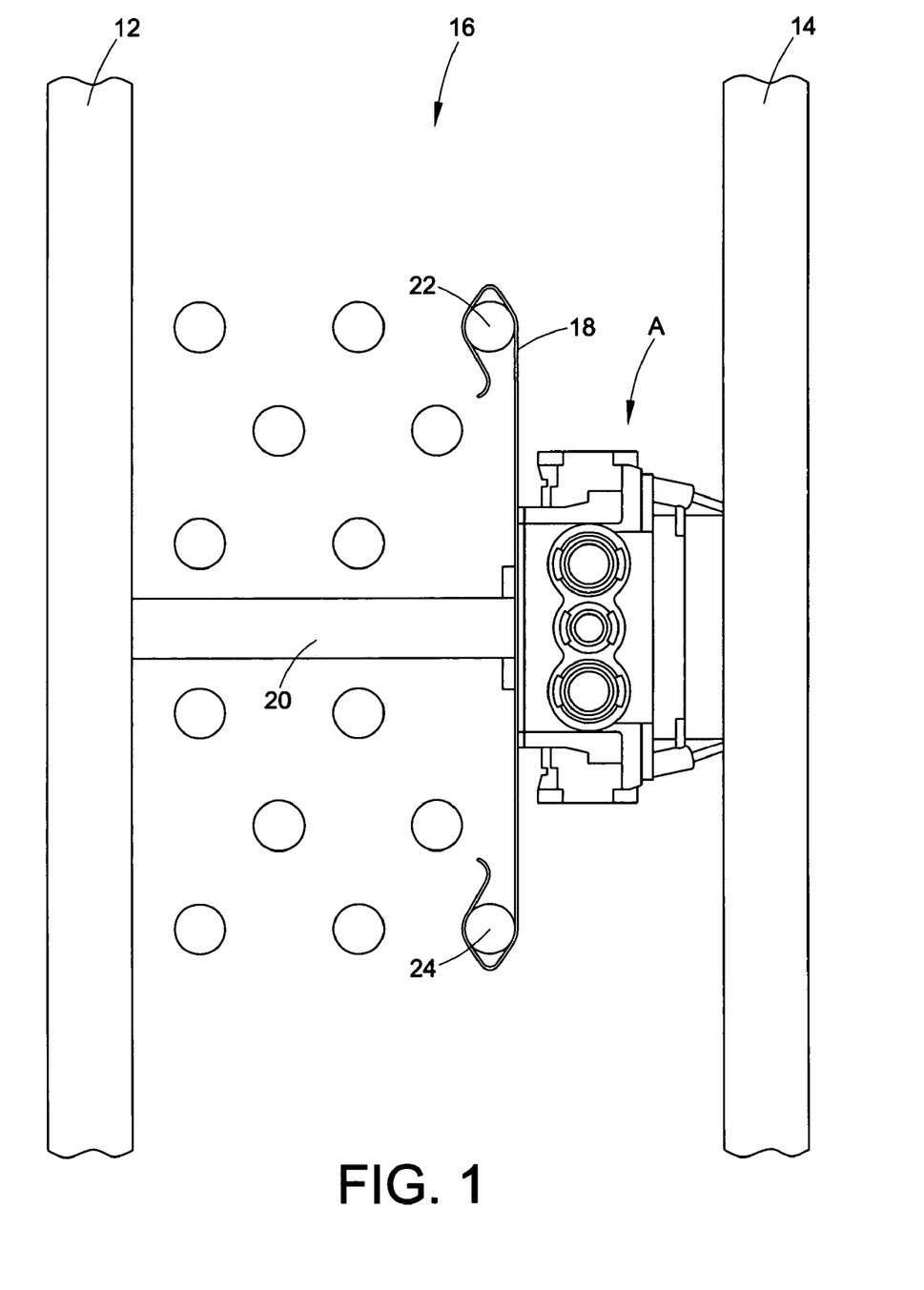
FIG. 1 is a top plan view of a pair of spaced-apart concrete forms and an electrical box assembly installed in the space between the forms.

Referring now to the drawings, wherein the showings are for purposes of illustrating representative embodiments only and not for purposes of limiting same, FIG. 1 shows a pair of parallel spaced-apart steel concrete forms 12, 14 defining a space 16 therebetween to be filled with poured concrete for forming a vertical building wall.

An electrical box assembly A has manually bendable galvanized sheet metal straps 18, 20 attached to the rear surface thereof. Strap 18 may be used for attaching the box assembly to reinforcing bars 22, 24 within space 16 by manually bending the strap around the bars. The other circles in FIG. 1 represent additional reinforcing bars, and it will be understood that there are other unshown reinforcing bars that extend generally perpendicular to the bars that are shown.

The other strap 20 may be deformed so that its outer end portions will be engaged by the inner surface of form 12 to urge box assembly A toward the inner surface of form 14. While the front end of box assembly A is shown engaging the inner surface of form 14, the front end of box assembly A often is spaced away from the inner surface of form 14 or otherwise is not in sealing engagement therewith.

Typically, a reinforcing bar cage is assembled first and vertically positioned where the wall is to be poured. The electrical box assembly is positioned such that the front end extends out of the plane in which the inner surface of a form 14 will be located, and the strap 20 has its ends extending out of the plane in which the inner surface of a form 12 will be located. When the forms are moved into proper position on opposite sides of the reinforcing bar cage, the form inner surfaces engage the free ends of the strap 20 and the front end of the box assembly, and the straps bend as the forms are moved into position. This procedure attempts to maintain the front end of the box assembly as close as possible to the inside surface of the form 14 or in engagement therewith.

Figure 2:
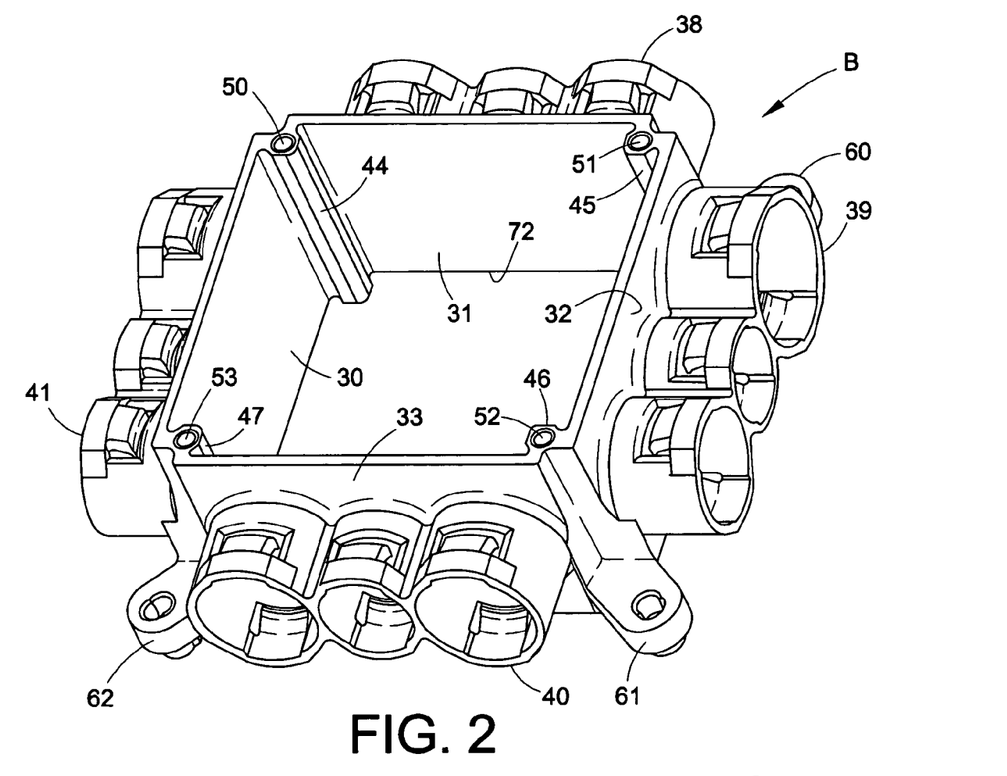
FIG. 2 is a perspective illustration of a molded plastic electrical mud box.

FIG. 2 shows an electrical box B molded in one-piece of plastic material to have a peripheral wall formed by sidewalls 30, 31, 32 and 33. A plurality of integrally molded sockets 38, 39, 40 and 41 extend outwardly from each box sidewall for receiving electrical non-metallic tubing or conduit. Knockouts are provided in the sidewalls at the bottoms of the sockets in a known manner.

Enlarged internal corner bosses 44, 45, 46 and 47 are molded integrally with the box and have fastener receiving holes 50, 51, 52 and 53 therein. Fastener receiving legs extend outwardly from the corners of square box B and only three of such fastener receiving legs are indicated in FIG. 2 at 60, 61 and 62, while the fourth is shown at 63 in FIG. 10. Number 70 designates the rear surface of the box peripheral wall and number 72 designates the front surface of the box peripheral wall. The front and rear surfaces surround front and rear box openings through which access is provided to the cavity within the box peripheral wall.

Figure 3:
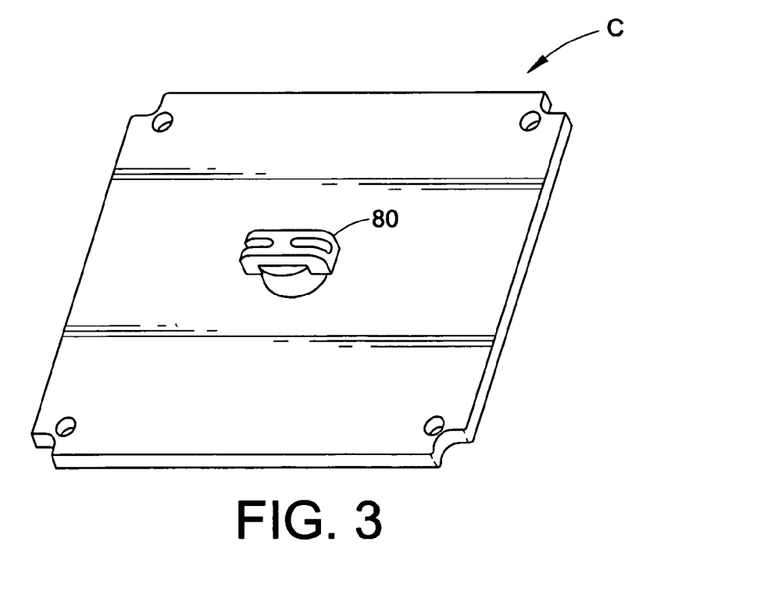
FIG. 3 is a perspective illustration of a cover for the rear opening in the mud box of FIG. 2.

FIG. 3 shows a rectangular cover C having suitable holes adjacent the corners thereof for receiving fasteners that extend into fastener receiving holes 50–53 in the box of FIG. 2 when the cover is positioned against box rear surface 70 to close the rear opening to the box interior cavity. A centrally located generally T-shaped lug 80 is provided on the outer surface of cover C for use in attaching galvanized sheet metal straps 18, 20 thereto. The straps have generally keyhole-shaped central openings therein for reception over lug 80. Rotating the outer strap 90° then secures the straps to the cover with the initial strap held on by the outer strap.

Figure 4:
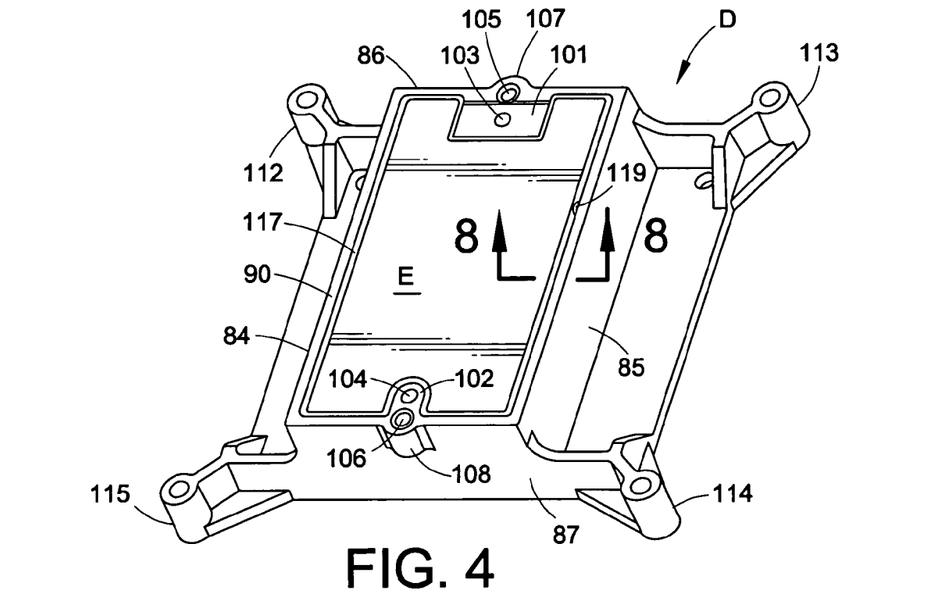
FIG. 4 is a perspective illustration of a molded plastic electrical enclosure in the form of a single gang adapter having a knockout cover that is used with the box of FIG. 2.
Figure 5:
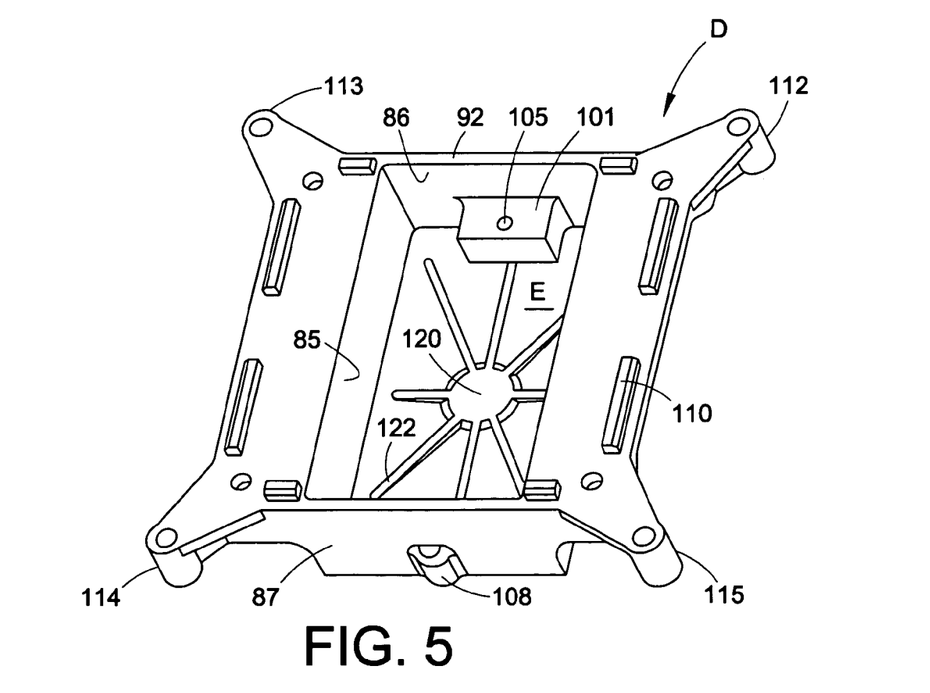
FIG. 5 is a perspective illustration from the rear of the enclosure of FIG. 4.

FIGS. 4 and 5 show an electrical enclosure in the form of a single gang adapter D that is molded in one-piece of plastic material. Adapter D has a peripheral wall of generally rectangular shape with opposite sidewalls 84, 85 and top and bottom walls 86, 87. The peripheral wall has a plane front outer surface 90 and a plane rear surface 92. A cavity is defined within the peripheral wall between front and rear surfaces 90, 92 thereof. Front and rear openings within front and rear surfaces 90, 92 provide access to the interior cavity.

Enlarged bosses 101, 102 molded integrally with top and bottom walls 86, 86 have fastener receiving holes 103, 104 therein for use in attaching electrical components within the enclosure cavity. The fastener receiving openings 103, 104 have entrance openings adjacent front surface 90 of the enclosure peripheral wall.

Bosses 101, 102 project inwardly of the enclosure cavity from the inner surfaces of top and bottom walls 86, 87. Fastener receiving holes 103, 104 receive the fasteners that attach a switch, receptacle or other component within the enclosure. Certain components, such as ground fault interrupters and decorative switches, have fastener receiving holes on their mounting plates for use in attaching coverplates or escutcheon plates. Fastener clearance holes 105, 106 provide openings for receiving the fasteners that attach a cover or escutcheon plate to the mounting plate of a ground fault interrupter or decorative switch. Clearance holes 105, 106 are partly within outwardly extending bosses 107, 108, and partly within top and bottom walls 86, 87.

A plurality of alignment projections are provided on rear surface 92, and only one of such projections is identified by a number 110 in FIG. 5. These alignment projections are located for close reception within the front opening in box B of FIG. 2 just inside the inner surfaces of sidewalls 30–33 to align adapter fastener receiving legs 112, 113, 114 and 115 with box legs 60–63. Fasteners are extended through the holes in box legs 61–63 and into the fastener receiving holes in adapter legs 112–115 for securing the box and adapter together with rear surface 92 of adapter D engaging box front surface 72.

Figures 8, 8A, 9:
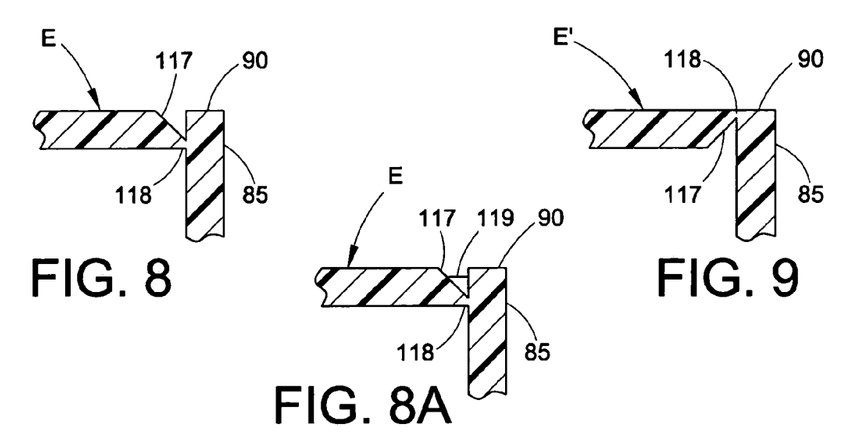
FIG. 8 is a partial cross-sectional elevational view taken generally on line 8—8 of FIG. 4.
FIG. 8A is a view similar to FIG. 8 and showing a plastic runner extending across a groove in the knockout cover.
FIG. 9 is partial cross-sectional elevational view taken generally on line 9—9 of FIG. 6.

A removable knockout cover E is molded integrally in one-piece with electrical enclosure D. A peripheral weakening groove 117 is molded into cover E around the intersection thereof with the peripheral wall of the enclosure. As shown in FIG. 8, the weakening groove 117 leaves cover E attached to the inside surface of the peripheral wall by a thin frangible web 118.

The groove 117 has the general shape of a right triangle, and the outer groove surface generally coincides with the inner surfaces of enclosure walls 84–87. One or more runners, only one of which is indicated at 119 in FIGS. 4 and 8A, may extend across groove 117 from an enclosure wall. The runner is a narrow area where groove 117 is not as deep and web 118 is thicker to provide good flow of plastic across the groove during molding. Runners of this general type are described in U.S. Pat. No. 5,444,183 to Gehrs et al, the disclosure of which is hereby incorporated herein by reference. The runners also increase the resistance against removal of the cover and a plurality of them may be provided at spaced intervals to increase the strength of web 114 so as to be capable of resisting higher hydraulic pressure on the knockout cover while providing a relatively clean break from the peripheral wall when a blow or force is applied to the cover.

Cover E may have a central thickened area 120 as indicated in FIG. 5 with a plurality of spaced ribs radiating therefrom, only one of which is indicated by a number 122 in FIG. 5. The central reinforcement and radiating ribs transfer force to the outer periphery of cover E when a blow or force is applied thereto to ensure that the cover will separate at its intersection with the peripheral wall.

Figure 6:
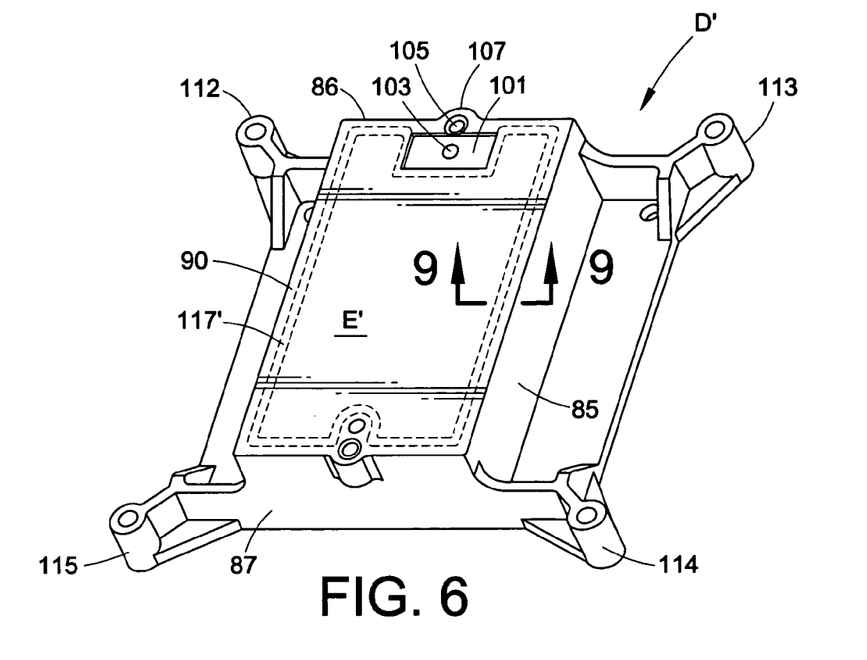
FIGS. 6 and 7 are perspective illustrations similar to FIGS. 4 and 5, but with the weakening groove in the knockout cover located on the opposite surface thereof from the arrangement of FIGS. 4 and 5.
Figure 7:
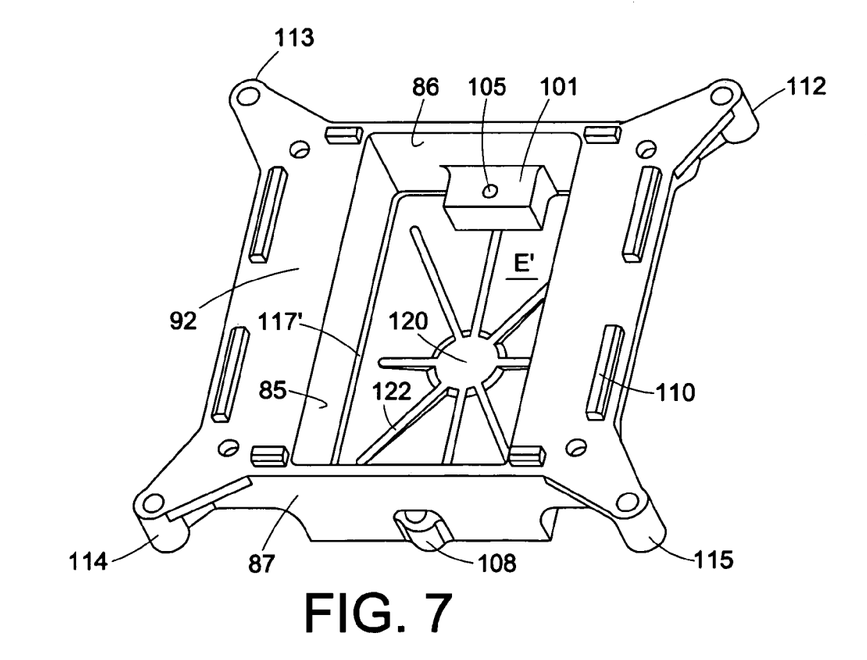
Figure 10:
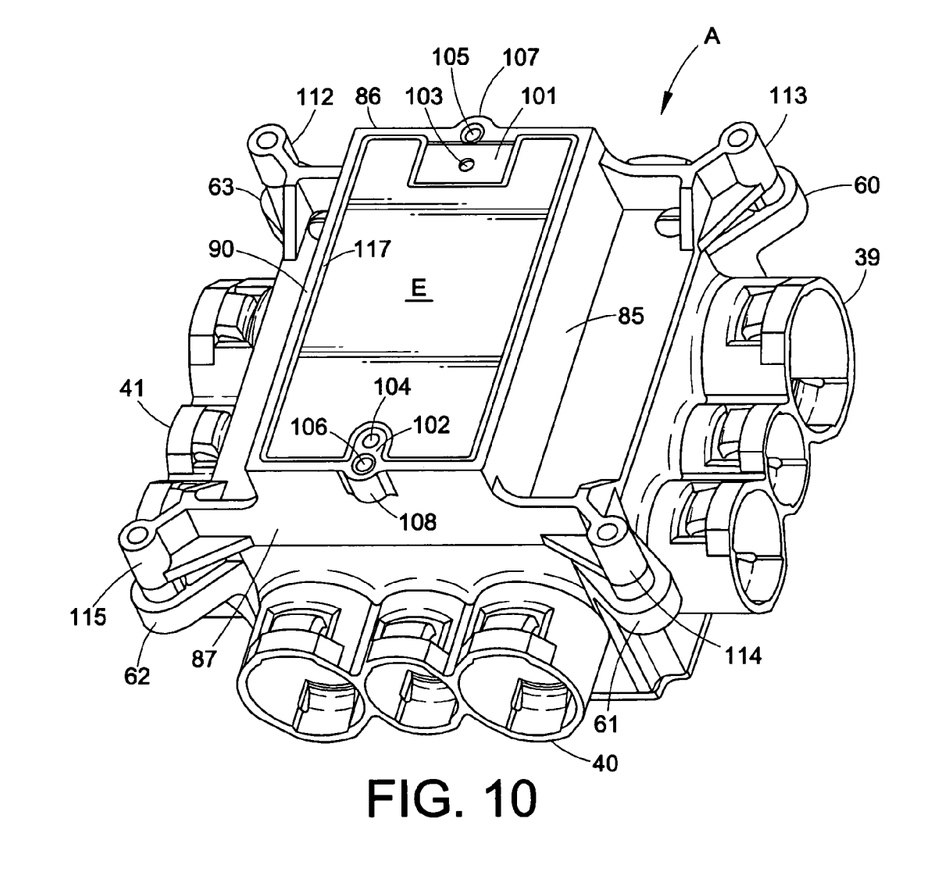
FIG. 10 is a perspective illustration showing the adapter of FIG. 4 installed on the box of FIG. 2.
Figure 11:
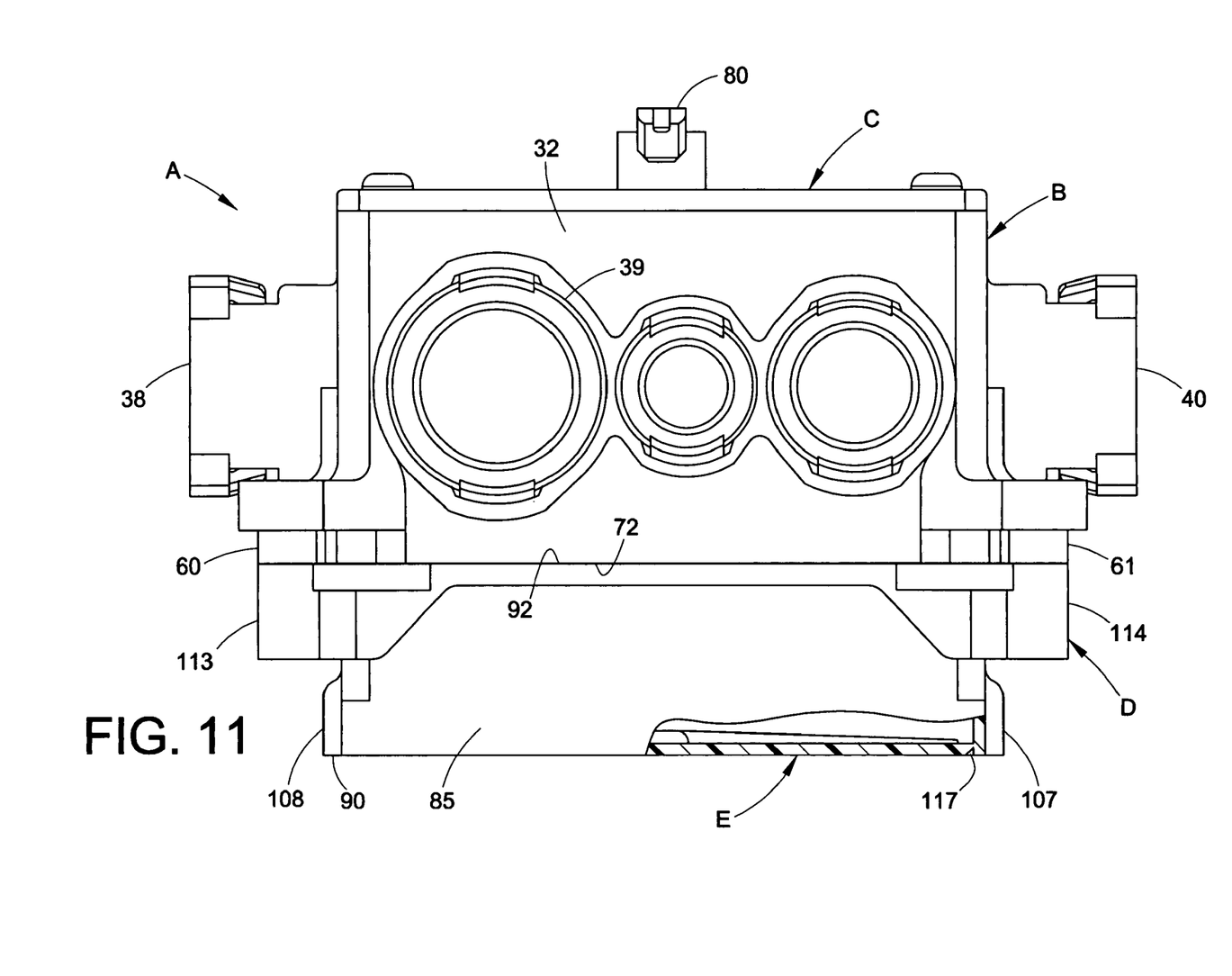
FIG. 11 is a side elevational view of the electrical box assembly of FIG. 10 with a portion of a peripheral wall cut-away for clarity of illustration.
Figure 12:
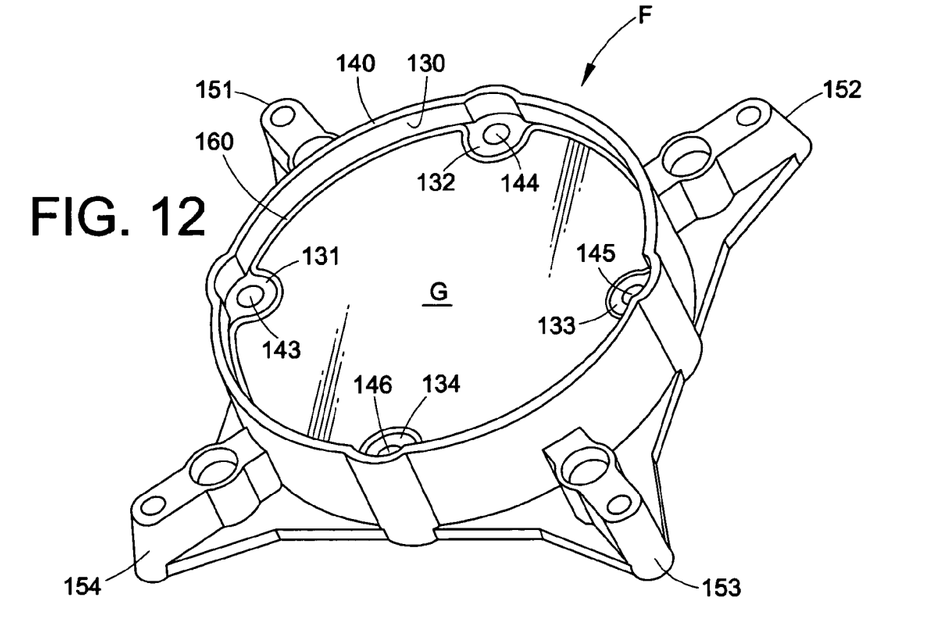
FIG. 12 is a perspective illustration of another electrical enclosure in the form of a ceiling ring that is used with the box of FIG. 2.
Figure 13:
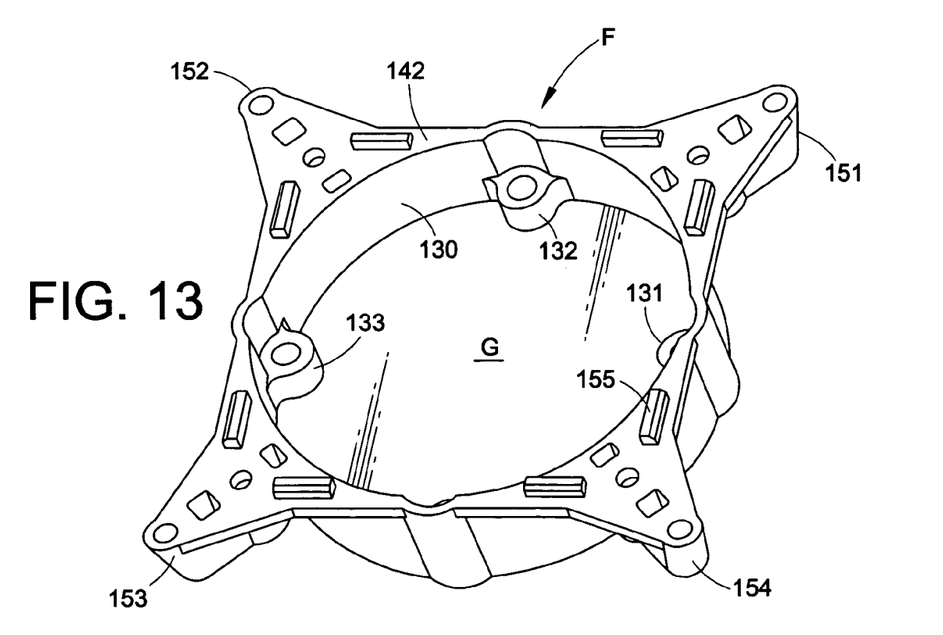
FIG. 13 is perspective illustration from the opposite side of FIG. 12.
Figure 14:
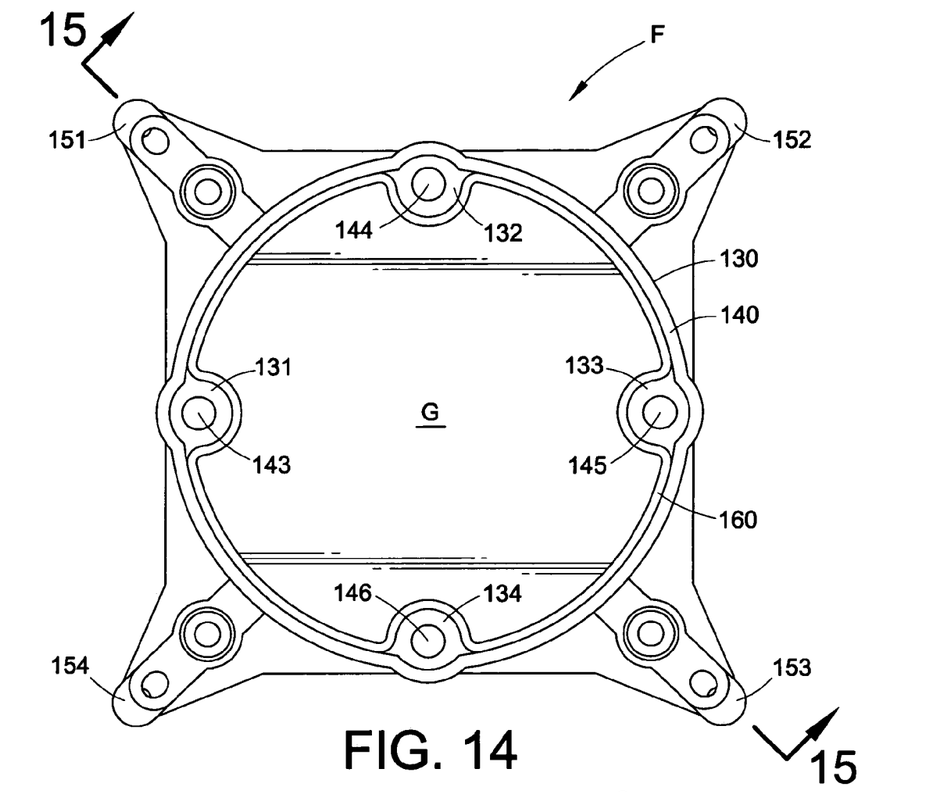
FIG. 14 is a plan view looking at the front surface of the ceiling ring of FIGS. 12 and 13.
Figure 15:
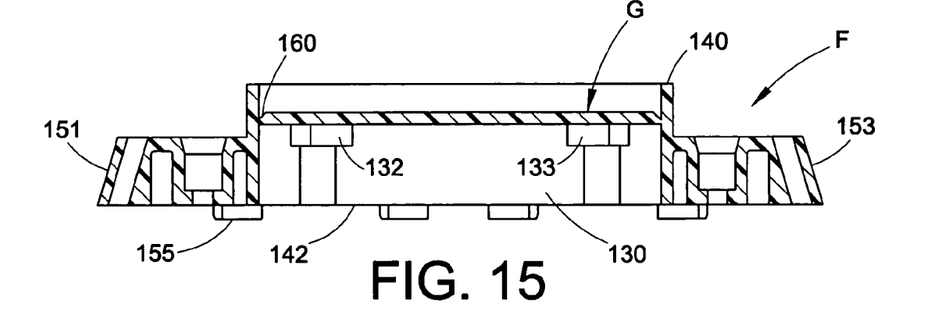
FIG. 15 is a cross-sectional elevational view taken generally on line 15—15 of FIG. 14.

FIGS. 6 and 7 show generally the same arrangement as FIGS. 4 and 5, but with the weakening groove 117' in cover E' formed on the inside surface of the cover rather than on the outside surface thereof. Cover E' then is connected with the peripheral wall by a thin frangible web 118'. The outside surface of the cover preferably is either flush with the outer surface 90 of the peripheral wall or is slightly recessed within the cavity from outer surface 90. FIGS. 10 and 11 show the enclosure adapter of FIGS. 4 and 5 assembled to the box of FIG. 2.

FIGS. 12–15 show another arrangement wherein an electrical enclosure F is in the form of a ceiling ring adapter. Enclosure F has a generally circular peripheral wall 130 having a plurality of circumferentially-spaced enlarged bosses 131, 132, 133 and 134 molded on the inner surface thereof and projecting generally radially inwardly therefrom.

Peripheral wall 130 has a plane front surface 140 and a plane rear surface 142. Enlarged bosses 131–134 are spaced toward rear surface 142 from front surface 130 and have fastener receiving holes 143, 144, 145 and 146 therein. The fastener receiving holes may be in metal inserts that are molded into the bosses.

Bosses 131–134 are recessed within the peripheral wall from front surface 140. The recess distance should not be too great because a thick layer of concrete that overlies a removable knockout cover is difficult to remove, and its removal may damage the box or the surrounding surface of a finished concrete wall. In the arrangement shown, the front surfaces of bosses 131–134 are spaced around one-fourth of an inch from outer surface 140.

A plurality of attachment legs 151, 152, 153 and 154 extend outwardly from peripheral wall 130. Suitable fastener receiving holes are provided in legs 151–154 for attaching adapter F to box B of FIG. 2 in the same manner as adapter D. Alignment projections 155 on rear surface 142 function in the same manner as alignment projections 110 on adapter D.

Removable cover G is molded integrally with enclosure F, and a weakening groove 160 is provided around the periphery of the cover adjacent its intersection with the inner surface of peripheral wall 30 and with the inwardly facing surfaces of bosses 131–134. The weakening groove is similar to those described with reference to FIGS. 4–9. Adapter F is attachable to the box of FIG. 2 in the same manner as the adapter of FIGS. 4 and 5 to form a mud box assembly.

It will be recognized that the improvements of this application also may be used with other types of adapters, such as a four square adapter or a two gang adapter.

Figure 16:
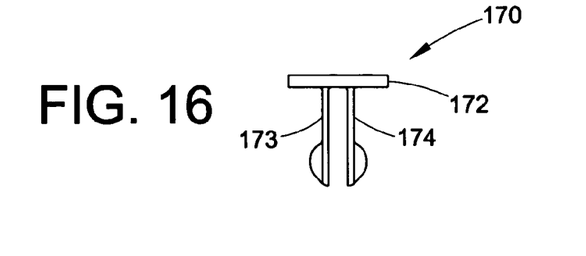
FIG. 16 is an elevational view of a barrier plug that is removably inserted into fastener receiving holes in the front surface of the electrical enclosure to prevent concrete from entering such holes.

FIG. 16 shows a plug member 170 having an enlarged head 172 and a pair of spaced-apart spring legs 173, 174 that are receivable in the fastener receiving or clearance holes in the front surfaces of the enclosures. For example, the plugs 170 may be inserted into fastener receiving holes 103, 104 in the electrical enclosure of FIGS. 4 and 5 or in the fastener receiving holes 141–144 in the enclosure of FIGS. 12–15. In the alternative, metal or plastic foil disks or strips may be adhesively secured to the bosses in overlying relationship to the fastener receiving or clearance holes for preventing ingress of poured concrete. The foil may be removed or pierced for subsequently inserting fasteners into the fastener receiving or clearance holes.

Any thin layer of concrete that may overlie cover E on enclosure D or that may fill the space between cover G and outer surface 140 of enclosure F is easily broken away and removed for access to the knockout cover.

In the arrangements shown and described, the front openings in adapters D and F have both a different size and shape relative to the size and shape of the front opening in the square box. Other arrangements may have adapter front openings with generally the same size and shape as the box front opening, or that differ in size and/or shape from the box front opening.

Although the improvements of this application have been shown and described with reference to representative embodiments, it is obvious that alterations and modifications will occur to others skilled art upon the reading and understanding of this disclosure. Therefore, it is to be understood that the improvements may be practiced otherwise than as specifically described herein while remaining within the scope of the claims.

I claim:

1. An electrical enclosure for use in poured concrete construction comprising:

an electrical enclosure molded of plastic material;

said enclosure having a peripheral wall with front and rear surfaces;

said enclosure having a cavity within said peripheral wall between said front and rear surfaces;

said peripheral wall having an inner surface that extends between said front and rear surfaces and also forms the periphery of said cavity;

said enclosure having front and rear entrance openings to said cavity at said front and rear surfaces of said peripheral wall;

said peripheral wall having a plurality of spaced-apart enlarged bosses with fastener receiving holes therein adjacent said front opening;

said enclosure being positionable with said front surface thereof adjacent to or engaging an inside surface of a concrete form;

a rear cover attached against said rear surface and closing said rear opening;

a removable knockout cover of plastic material closing said front entrance opening for sealing said front entrance opening against entrance of poured concrete into said cavity;

said knockout cover having a thickness; and said removable knockout cover being molded integrally in one-piece with said peripheral wall and being attached to said peripheral wall inner surface by a frangible web that extends around the periphery of said knockout cover and has a web thickness that is less than said knockout cover thickness.

2. An electrical enclosure for use in poured concrete construction comprising:

an electrical enclosure molded of plastic material;

said enclosure having a peripheral wall with front and rear surfaces;

said enclosure having a cavity within said peripheral wall between said front and rear surfaces;

said enclosure having front and rear entrance openings to said cavity at said front and rear surfaces of said peripheral wall;

said peripheral wall having a plurality of spaced-apart enlarged bosses with fastener receiving holes therein adjacent said front opening;

said enclosure being positionable with said front surface thereof adjacent to or engaging an inside surface of a concrete form;

said enclosure having a removable cover of plastic material tar does not overlie said fastener receiving holes and closes said front entrance opening against entrance of poured concrete into said cavity; and barriers attached to said box for closing said fastener receiving holes against entrance of concrete.

3. The enclosure of claim 2 wherein said barriers comprise plugs removably received in said holes.

4. The enclosure of claim 2 wherein said barriers comprise foil overlying said holes and adhesively bonded to said box.

5. In a poured concrete construction including a concrete form having a form surface against which concrete is pourable;
an electrical enclosure molded of plastic material;
said enclosure having a peripheral wall with front and rear surfaces;
said enclosure having a cavity within said peripheral wall between said front and rear surfaces;
said enclosure having front and rear entrance opening to said cavity at said front and rear surfaces of said peripheral wall;
said enclosure being positioned with said front surface thereof adjacent to or engaging said form surface;
said enclosure having a removable cover of plastic material closing said front entrance opening against entrance of concrete in which the enclosure is submerged when the concrete is poured against the form surface, said cover being a knockout that is molded integrally with said peripheral wall, said peripheral wall having an inner wall surface that intersects said front surface of said peripheral wall and said cover being separably attached to said peripheral wall at said inner wall surface by a frangible web that is formed by a groove that extends around said cover between said cover and said inner wall surface of said peripheral wall.

6. An electrical enclosure for use in poured concrete construction comprising:
an electrical enclosure molded of plastic material;
said enclosure having a peripheral wall with front and rear surfaces;
said enclosure having a cavity within said peripheral wall between said front and rear surfaces;
said enclosure having front and rear entrance openings to said cavity at said front and rear surfaces of said peripheral wall;
said enclosure being positionable with said front surface thereof adjacent to or engaging an inside surface of a concrete form;
said enclosure having a removable cover of plastic material closing said front entrance opening for sealing said front entrance opening against entrance of poured concrete into said cavity, said peripheral wall having a peripheral inner surface that extends between said front and rear surfaces and forms the periphery of said cavity, and said removable cover having an outer cover surface that is flush with or recessed within said cavity from said front surface of said peripheral wall, and said cover being a knockout cover that is molded integrally with said peripheral wall and is attached to said inner surface of said peripheral wall by a frangible web.

7. The enclosure of claim 6 wherein said cover has a peripheral groove therein adjacent said inner surface of said peripheral wall to define said frangible web.

8. An electrical enclosure for use in poured concrete construction comprising:
an electrical enclosure molded of plastic material;
said enclosure having a peripheral wall with front and rear surfaces;
said enclosure having a cavity within said peripheral wall between said front and rear surfaces;
said peripheral wall having an inner surface that extends between said front and rear surfaces and also forms the periphery of said cavity;
said enclosure having front and rear entrance openings to said cavity at said front and rear surfaces of said peripheral wall;
said peripheral wall having a plurality of spaced-apart enlarged bosses with fastener receiving holes therein adjacent said front opening;
said enclosure being positionable with said front surface thereof adjacent to or engaging an inside surface of a concrete form;
a rear cover attached against said rear surface and closing said rear opening;
a removable knockout cover of plastic material closing said front entrance opening for sealing said front entrance opening against entrance of poured concrete into said cavity;
said knockout cover having a thickness;
said removable knockout cover being molded integrally in one-piece with said peripheral wall and being attached to said peripheral wall inner surface by a frangible web that extends around the periphery of said knockout cover and has a web thickness that is less than said knockout cover thickness; and
said enclosure including a box and an adapter that are secured together and said rear cover being on said box and said removable knockout cover being on said adapter.

9. An electrical enclosure for use in poured concrete construction comprising:
an electrical enclosure molded of plastic material;
said enclosure having a peripheral wall with front and rear surfaces;
said enclosure having a cavity within said peripheral wall between said front and rear surfaces;
said peripheral wall having an inner surface that extends between said front and rear surfaces and also forms the periphery of said cavity;
said enclosure having front and rear entrance openings to said cavity at said front and rear surfaces of said peripheral wall;
said peripheral wall having a plurality of spaced-apart enlarged bosses with fastener receiving holes therein adjacent said front opening;
said enclosure being positionable with said front surface thereof adjacent to or engaging an inside surface of a concrete form;
a rear cover attached against said rear surface and closing said rear opening;
a removable knockout cover of plastic material closing said front entrance opening for sealing said front entrance opening against entrance of poured concrete into said cavity;
said knockout cover having a thickness;
said removable knockout cover being molded integrally in one-piece with said peripheral wall and being attached to said peripheral wall inner surface by a frangible web that extends around the periphery of said knockout cover and has a web thickness that is less than said knockout cover thickness;
said knockout cover having a peripheral groove therein adjacent said peripheral wall inner surface to define said frangible web; and
a plurality of spaced-apart runners of increased thickness extending across said groove between said knockout cover and said peripheral wall to provide flow of plastic across said groove between said knockout cover and said peripheral wall during molding of said enclosure.

10. In a poured concrete construction including a concrete form having a form surface against which concrete is pourable;
an electrical enclosure molded of plastic material;
said enclosure having a peripheral wall with front and rear surfaces;
said enclosure having a cavity within said peripheral wall between said front and rear surfaces;
said enclosure having front and rear entrance openings to said cavity at said front and rear surfaces of said peripheral wall;
said enclosure being positioned with said front surface thereof adjacent to or engaging said form surface;
said enclosure having a removable cover of plastic material closing said front entrance opening against entrance of concrete in which the enclosure is submerged when the concrete is poured against the form surface; and
said peripheral wall having a plurality of spaced-apart enlarged bosses projecting into said front entrance opening and said removable cover does not overlie said bosses.

11. An electrical enclosure for use in poured concrete construction comprising:
an electrical enclosure molded of plastic material;
said enclosure having a peripheral wall with front and rear surfaces;
said enclosure having a cavity within said peripheral wall between said front and rear surfaces;
said enclosure having front and rear entrance openings to said cavity at said front and rear surfaces of said peripheral wall;
said enclosure being positionable with said front surface thereof adjacent to or engaging an inside surface of a concrete form;
said enclosure having a removable cover of plastic material closing said front entrance opening for sealing said front entrance opening against entrance of poured concrete into said cavity; and
said peripheral wall having a plurality of spaced-apart enlarged bosses projecting into said front entrance opening and said removable cover does not overlie said bosses.

12. The enclosure of claim 11 wherein said cover is molded integrally with said peripheral wall and is attached to both said peripheral wall and to said bosses by a frangible web.

13. An electrical enclosure for use in poured concrete construction comprising:
an electrical enclosure molded of plastic material;
said enclosure having a peripheral wall with front and rear surfaces;
said enclosure having a cavity within said peripheral wall between said front and rear surfaces;
said enclosure having front and rear entrance openings to said cavity at said front and rear surfaces of said peripheral wall;
said enclosure being positionable with said front surface thereof adjacent to or engaging an inside surface of a concrete form;
said enclosure having a removable cover of plastic material closing said front entrance opening for sealing said front entrance opening against entrance of poured concrete into said cavity; and
said enclosure being an adapter having outwardly extending attachment tabs extending outwardly from said peripheral wall adjacent said rear surface thereof for receiving fasteners to attach said adapter to a molded plastic box and for receiving fasteners to attach said adapter to a concrete form with said front surface engaging a form surface.

14. The enclosure of claim 13 and further including a molded plastic box to which said adapter is attached at said rear surface thereof by way of said attachment tabs, said box having a box surface opposite from said adapter that is closed by a removable box cover.

15. An electrical enclosure for use in poured concrete construction comprising:
an electrical enclosure molded of plastic material;
said enclosure having a peripheral wall with front and rear surfaces;
said enclosure having a cavity within said peripheral wall between said front and rear surfaces;
said enclosure having front and rear entrance openings to said cavity at said front and rear surfaces of said peripheral wall;
said enclosure being positionable with said front surface thereof adjacent to or engaging an inside surface of a concrete form;
said enclosure having a removable cover of plastic material closing said front entrance opening for sealing said front entrance opening against entrance of poured concrete into said cavity;
fastener receiving holes adjacent said front opening;
said cover being configured so that it does not overlie said holes; and
barriers closing said fastener receiving holes against entrance of concrete.

16. The enclosure of claim 15 wherein said barriers comprise plugs removably received in said holes.

17. The enclosure of claim 15 wherein said barriers comprise foil overlying said holes and adhesively bonded to said box.

* * * * *

UNITED STATES PATENT AND TRADEMARK OFFICE
CERTIFICATE OF CORRECTION

PATENT NO. : 6,998,531 B2
APPLICATION NO. : 10/808853
DATED : February 14, 2006
INVENTOR(S) : Eric G. Hull

It is certified that error appears in the above-identified patent and that said Letters Patent is hereby corrected as shown below:

Column 6, line 63, change "tar" to -- that --.

Column 7, line 15, change "opening" to -- openings --.

Signed and Sealed this

Tenth Day of October, 2006

JON W. DUDAS
*Director of the United States Patent and Trademark Office*